US009517529B2

(12) United States Patent
Mialhe et al.

(10) Patent No.: US 9,517,529 B2
(45) Date of Patent: Dec. 13, 2016

(54) SYSTEM FOR FRICTION STIR WELDING INCLUDING A MOBILE COUNTER-BEARING

(71) Applicant: AIRBUS OPERATIONS (S.A.S.), Toulouse (FR)

(72) Inventors: Christophe Mialhe, Giroussens (FR); Patrick Lieven, Fronton (FR); Romain Delahaye, Colomiers (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/015,083

(22) Filed: Aug. 30, 2013

(65) Prior Publication Data
US 2014/0069984 A1  Mar. 13, 2014

(30) Foreign Application Priority Data

Sep. 7, 2012  (FR) ...................................... 12 58393

(51) Int. Cl.
*B23K 20/12* (2006.01)

(52) U.S. Cl.
CPC .......... *B23K 20/122* (2013.01); *B23K 20/126* (2013.01); *B23K 20/1255* (2013.01); *B23K 20/1265* (2013.01)

(58) Field of Classification Search
None
See application file for complete search history.

(56) References Cited

U.S. PATENT DOCUMENTS

| 6,070,784 | A | 6/2000 | Holt et al. | |
| 6,237,835 | B1 * | 5/2001 | Litwinski et al. | ......... 228/112.1 |
| 6,419,142 | B1 | 7/2002 | Larsson | |
| 6,460,752 | B1 * | 10/2002 | Waldron et al. | ........... 228/112.1 |
| 6,779,707 | B2 | 8/2004 | Dracup et al. | |
| 7,028,880 | B2 * | 4/2006 | Narita et al. | ............... 228/112.1 |
| 7,494,092 | B2 | 2/2009 | Brenner et al. | |
| 7,857,191 | B2 | 12/2010 | Fernandez et al. | |

(Continued)

FOREIGN PATENT DOCUMENTS

| DE | 10 2008/044087 | 5/2010 |
| EP | 1 864 747 | 12/2007 |

(Continued)

OTHER PUBLICATIONS

French Search Report for Application No. FR 1258393 dated May 24, 2013.

(Continued)

*Primary Examiner* — Devang R Patel
(74) *Attorney, Agent, or Firm* — Jenkins, Wilson, Taylor & Hunt, P.A.

(57) ABSTRACT

System for friction stir welding of two parts which includes a welding unit which includes at least one welding head fitted with a rotating pin and a counter-bearing unit which has a support surface to support the parts against a pressure exerted by the welding head, and wherein each welding head can be moved relative to the support surface in a first direction parallel to an axis of rotation of the rotating pin and in a second direction orthogonal to the axis of rotation, and wherein the support surface can be moved in the second direction and is formed of two coaxial clamp rollers which are set apart from each other.

3 Claims, 8 Drawing Sheets

(56) References Cited

U.S. PATENT DOCUMENTS

| | | |
|---|---|---|
| 8,056,797 B2 | 11/2011 | Packer et al. |
| 8,356,772 B2 | 1/2013 | Bense et al. |
| 8,398,024 B2 | 3/2013 | Tucker |
| 2001/0040179 A1* | 11/2001 | Tochigi et al. ............... 228/2.1 |
| 2005/0139640 A1 | 6/2005 | Kay |
| 2006/0191979 A1 | 8/2006 | Lohwasser |
| 2007/0187466 A1 | 8/2007 | Sayama et al. |
| 2008/0308610 A1 | 12/2008 | Watson et al. |
| 2011/0268494 A1 | 11/2011 | Pacchione et al. |
| 2012/0228272 A1* | 9/2012 | Carlson et al. ................ 219/75 |
| 2013/0206817 A1* | 8/2013 | Tavares et al. ........... 228/112.1 |
| 2013/0256457 A1 | 10/2013 | Goehlich |
| 2014/0069987 A1 | 3/2014 | Mialhe et al. |

FOREIGN PATENT DOCUMENTS

| | | |
|---|---|---|
| JP | H10-52772 | 2/1998 |
| JP | H11-28581 | 2/1999 |
| JP | H11-47959 | 2/1999 |
| JP | 2004-017128 | 1/2004 |

OTHER PUBLICATIONS

French Search Report for Application No. FR 1258392 dated May 27, 2013.

Extended European Search Report for Application No. 131881474, dated Mar. 19, 2014.

Non-Final Office Action for U.S. Appl. No. 14/015,103 dated Jun. 17, 2016.

Final Office Action for U.S. Appl. No. 14/015,103 dated Nov. 25, 2015.

Advisory Action for U.S. Appl. No. 14/015,103 dated Feb. 5, 2016.

Restriction Requirement for U.S. Appl. No. 14/015,103 dated Mar. 3, 2015.

Non-Final Office Action for U.S. Appl. No. 14/015,103 dated May 28, 2015.

* cited by examiner

SYSTEM FOR FRICTION STIR WELDING INCLUDING A MOBILE COUNTER-BEARING

TECHNICAL FIELD

The present invention relates to a system and process for assembling two parts by the technique of friction stir welding (FSW).

The invention finds application in particular in the fixing of stiffeners on aircraft panels, in particular panels of aeroplanes.

The panels concerned by the inventions may be fuselage panels, wing surface panels or tail assembly panels, or yet again panels which form part of a storage tank or a landing gear compartment, or any other type of panel.

The stiffeners fixed to these panels may in particular be fuselage circumferential frames, fuselage longitudinal stringers or stiffeners, wing or tail assembly spars or ribs, floor cross-members or floor rails etc.

BACKGROUND

The technique referred to as Friction Stir Welding (FSW) is known, in general, for making fast durable mechanical joints which allow forces to pass between assembled parts with an efficiency which is at least equivalent to that achieved using a conventional riveted joint.

This technique, shown schematically in FIG. 1, uses a welding device which includes at least one welding head 10, which includes a rotating pin 12, a shoulder 14, which extends to the base of the rotating pin 12 and which has a diameter which is typically equal between 2 and 2.5 times the mean diameter of this rotating pin 12.

Friction stir welding of two parts 16a, 16b involves introducing the rotating pin 12 into the two parts at the joint interface 18 between the latter until the shoulder 14 makes contact with the surface of each of the parts 16a, 16b. This introduction of the rotating pin 12 into the material making up the parts 16a, 16b, is made possible by local softening of this material as a result of the heating produced by the friction of the rotating pin 12 against the two parts 16a and 16b. The dough-like state of the material of the parts 16a, 16b around the rotating pin 12 then allows this rotating pin to move along the joint interface 18. The rotation of the rotating pin 12, as well as, if appropriate, that of the shoulder 14, causes mixing of the material in the dough-like state.

The extrusion caused by the rotating pin 12 and the forging effect produced by the shoulder thus gradually results in the formation of a weld bead. This weld bead takes the form of a new metallurgical structure common to the two materials, formed as a result of recovery-recrystallization, which thus guarantees good cohesion of the two parts 16a, 16b after cooling.

As shown schematically in FIG. 2, a counter-pressure is applied on the face of each part 16a, 16b opposite the welding head 10, using a counter-form 20, in order to counteract the pressure exerted by the rotating pin 12. Such a counter-form sometimes incorporates a cooling device which allows part of the heat generated by the friction to be removed. This, in general, improves the mechanical properties of the parts after welding. Such a cooling device takes the form, for example, of channels 21 which are incorporated in the counter-form 20 and in which a heat-transfer fluid flows.

The friction stir welding technique allows so-called "butt" welding to be carried out, as shown in FIGS. 1 and 2, in which the axis of the rotating pin 12 is locally parallel to the joint interface between the parts to be assembled.

This technique also allows so-called "transparency" welding to be carried out, in which the axis of the rotating pin 12 is locally orthogonal to the joint interface between the parts to be assembled. In this case one of the parts to be assembled is interposed between the welding head and the other part to be assembled.

The friction stir welding technique in particular exhibits the advantage of being carried out below the melting point of the constituent material of the parts to be assembled, which in particular avoids problems associated with re-solidification and which usually occur with other welding techniques.

This technique, in addition, offers the advantage of not requiring any filler materials, and of not causing any emission of polluting fumes.

Furthermore the speed at which the welding device moves along the joint interface of the parts to be assembled may reach 2 meters per minute, so that this welding technique allows parts to be assembled quickly and at reduced cost.

This welding technique in addition offers possibilities for high levels of automation.

Nevertheless, known friction stir welding processes do possess drawbacks.

The counter-form used must be manufactured to strict dimensional tolerances in order to fit against the surfaces to be assembled as closely as possible, in the case of butt welding or against one of the parts to be assembled in the case of transparency welding.

If this is not the case then the dimensions of the parts to be assembled must be adjusted beforehand, for example by means of mechanical machining, so that they match the geometry of the counter-form as closely as possible.

Furthermore level of the forces exerted by the welding head may reach several tonnes, so that the counter-form must in general be of large mass, especially when the parts to be assembled have a curved form, for example in the case of the assembly of a circumferential frame 22 onto an aircraft fuselage panel 24 as shown in longitudinal section in FIG. 3. Such a circumferential frame 22 includes a flange 26 which is substantially cylindrical in shape applied onto a fuselage panel 24, as well as a web 30 which extends substantially orthogonally to the base-plate 26.

Furthermore the mass of the counter-form will be greater and more complex to manufacture if it includes a cooling device which has to be capable of extracting significant quantities of heat.

SUMMARY

One aim of the invention is in particular to provide a simple, economic and efficient solution to these problems, allowing at least some of the above mentioned disadvantages to be avoided.

To this end the invention proposes a friction stir welding system for welding at least two parts to be assembled, which includes:

a welding unit which includes a welding device which includes at least one welding head provided with a rotating pin;

one counter-bearing unit which offers a support surface designed to support the parts to be assembled against a pressure exerted by each said welding head; and wherein each said welding head can be moved relative to said support surface of said counter-bearing unit, in a direction parallel to an axis of rotation of said rotating pin of the welding head, and each said welding head can be moved along a second direction which is orthogonal to the axis of rotation of the rotating pin of said welding head.

Furthermore, the counter-bearing unit includes means for moving said support surface along said second direction.

Such means of movement allow the support surface to be kept substantially opposite the welding head during displacement of the latter in said second direction.

This second direction may in effect be a direction tangential to the overall trajectory followed by said welding head during the implementation of a welding process using the present system. For this reason said second direction will be called the "direction of welding" in what is to follow.

When said welding head, initially outside the parts to be assembled, is moved along said first direction towards the parts to be assembled, the rotating pin of this welding head can penetrate into the material forming said parts, as will become clearer in what is to follow. For this reason, said first direction will sometimes be called the "direction of penetration" in the rest of the present description.

By proposing the use of a support surface which can move along the direction of welding, the invention avoids recourse to a massive counter-form of the type usually used, something which is particularly advantageous for the welding of curved parts.

Furthermore, the possibility of relative movement of the support surface and of the welding head along said first direction allows an optimal counter pressure against the pressure exerted by the welding head to be achieved, whilst still allowing a reduction in the need for dimensional precision of the support surface and for prior adjustment of the parts to be assembled.

It should be noted that the welding system according to the invention may, in general, be used to carry out butt welding as well as transparency welding.

The counter-bearing unit is preferably designed so as to allow said support surface to roll on one of the parts to be assembled. Such rolling may in effect be expressed as overall displacement of the support surface along the direction of welding.

According to the invention the counter-bearing unit includes two clamp rollers set apart from each other and which have a common axis of revolution which is substantially orthogonal to said first direction and to said second direction or direction of welding, each of said clamp rollers having a main circumferential track which forms at least one part of said support surface.

This configuration is particularly advantageous when one of the parts to be assembled is a stiffener which has a flange and a web, and when the welding system is used to carry out transparency welding of the flange of the stiffener onto another part, where the latter, for example takes the form of a panel.

In effect the clamp rollers perform the function of a support surface against the pressure exerted by said welding head, whilst allowing the web of such a stiffener to pass between the clamp rollers.

This configuration is therefore particularly advantageous when the web of the stiffener involved is substantially central in relation to the flange of the stiffener.

In general, such clamp rollers in particular offer the advantage of being able to incorporate a low-cost heat exchange device of simple design to allow effective cooling of the parts during welding.

Alternatively, such cooling may be carried out by spraying coolant onto the welding zone, for example by means of an additional robot provided for this purpose, or by immersion of the entire welding installation in a tank filled with a heat-exchange fluid, all without leaving the scope of the invention.

It should be noted that said support surface is preferably entirely formed of the respective main circumferential tracks of said clamp rollers.

Furthermore the clamp rollers can advantageously rotate about their common axis of rotation.

The clamp rollers are therefore capable of rolling over one of the parts to be assembled in order to allow said support surface to de displaced as a whole along said direction of welding.

In this case the axis of revolution of the clamp rollers forms an axis of rotation for the clamp rollers.

In the preferred embodiment of the invention the counter-bearing unit includes means of making one clamp-roller move towards the other.

This configuration in particular therefore allows the clamp rollers to sandwich the web of a stiffener whilst their respective main circumferential tracks are pressed against one flange of the stiffener.

This facilitates in particular the centring of such a stiffener when it is being welded onto another part.

Said means making one clamp roller move in the direction of the other include for example two support arms which respectively carry said clamp rollers.

In this case, in order to allow the clamp rollers to be made to move towards each other the counter-bearing unit preferably includes means for moving one of said support arms in the direction of the other.

These means for moving the support arms may be for example incorporated in a robotic arm.

Furthermore, each clamp roller is advantageously mounted so that it rotates on the corresponding support arm.

In the preferred embodiment of the invention, each of the clamp rollers has a circumferential shoulder protruding radially outwards, which delimits a lateral end of said main circumferential track of the clamp roller on the side facing the other clamp roller.

In the case of transparency welding of the two parts to be assembled, such a circumferential shoulder can contribute to the confinement and forming of the material forming a first of said parts, against which is pressed the support surface jointly formed by the respective main circumferential tracks of the clamp rollers.

Making each clamp roller move in the direction of the other clamp roller may, in effect, allow the shoulder of the clamp roller to be pressed against the edge of said first part.

In the preferred embodiment of the invention, each of said clamp rollers has a secondary circumferential track connected to said main circumferential track of said clamp roller through said circumferential shoulder of the clamp roller.

In the case of transparency welding of the two parts to be assembled, the secondary circumferential track of each clamp roller can be advantageously pressed onto a second of said parts, corresponding to the part found on the welding device side of the welding unit.

This configuration reinforces the confinement effect of the material provided by each clamp roller, as will become clearer in what is to follow.

In general the welding system according to the invention furthermore preferably includes a non-destructive inspection device carried by the welding unit and/or a non-destructive inspection device carried by the counter support.

Such a non-destructive inspection device controls the quality of the weld bead on-line, quickly and automatically.

In this case the welding system preferably includes in addition a repair device carried by the welding unit.

The non-destructive inspection device is then arranged between the aforementioned welding device and the repair device, allowing for the direction of welding.

Such a repair device includes a second welding device designed to carry out local re-work of the welding of the components to be assembled when a defect in the previously made weld bead is detected by the non-destructive inspection device.

The repair device avoids the welding device having to travel in reverse when a defect is detected, as will be more clearly shown in what is to follow.

In addition the welding system advantageously includes an anti-corrosion treatment device carried by the welding unit and/or an anti-corrosion treatment device carried by the counter-bearing unit.

Such an anti-corrosion treatment device is used to apply an anti-corrosion treatment onto the weld bead, if required, after inspection of the weld bead and after any repairs to the latter.

The invention also relates to a friction stir welding (FSW) process for linear welding of two parts by transparency welding using a welding system of the type described above, wherein:

said parts are superimposed:

the counter-bearing unit includes two clamp rollers set apart from each other and which have a common axis of revolution which is orthogonal to said first direction (or "direction of penetration") and to said second direction (or "direction of welding"), where each of said clamp rollers has a main circumferential track which forms at least a part of said support surface.

the rotating pin of each welding head of said welding device is plunged at least partially into a first of said parts by passing completely through the second part, then said rotating pin is moved in said second direction along a contact interface between the said parts, thanks to local softening of the material forming said parts caused by the heat induced by the friction of said rotating pin, so as to form a weld bead;

the support surface of said counter-bearing unit is pressed against said first part and is moved on the latter along said contact interface so as to counteract the pressure exerted by the rotating pin of each welding head of said welding device, during the movement of the rotating pin along said second direction.

This process naturally exhibits the advantages of the system described above in terms of mobility of the aforementioned support surface and in terms of reduced requirements for dimensional precision of the support surface and for prior adjustment of the parts to be assembled.

The rotating pin of each welding head has an axis of rotation which is locally orthogonal to the contact interface between the parts to be assembled.

The aforementioned first part is, for example, the flange of a stiffener, whilst the aforementioned second part is, for example, a panel, in particular of an aircraft, such as a fuselage panel.

As explained above, said support surface is preferably entirely formed by the respective main circumferential tracks of the clamp rollers.

Furthermore, said movement of said support surface is preferably achieved by means of movement of said clamp rollers along said contact interface by implementing rolling of said main circumferential tracks on said first part causing a rotation of each of the clamp rollers around its axis of revolution.

Preferentially the clamp rollers are made to move towards each other so that the two respective side-walls of these clamp rollers sandwich a portion of said first part.

The clamp rollers can thus in particular sandwich the web of a stiffener using their respective two side-walls whilst exerting a support force on the flange of the stiffener by means of their respective mean circumferential tracks, during welding of this flange onto a panel.

Preferentially the clamp rollers each have a circumferential shoulder pressed against an edge of said first part.

This allows the softened material forming said first part to be confined, thus preventing this part being deformed under the pressure exerted by each welding head and by said support surface.

In the preferred embodiment of the invention, each said clamp roller has a secondary circumferential track connected to said main circumferential track of the clamp roller through said circumferential shoulder of this clamp roller.

The secondary circumferential track of each clamp roller is pressed against said second part and rolls on the latter as the clamp roller moves along said contact interface.

This optimises the integrity of the confinement of the material that is achieved by the shoulder of each clamp roller.

In the preferred embodiment of the invention, said welding system includes a non-destructive inspection device carried by the welding unit and/or a non-destructive inspection device carried by the counter-bearing unit, and each non-destructive inspection device is moved in a manner which is synchronised with and delayed in relation to each welding head of said welding device, in order to carry out a non-destructive inspection of said weld bead.

The quality inspection of the weld bead may therefore be integrated into the welding process itself, and may thus be carried out automatically and rapidly.

The non-destructive inspection device is preferably arranged between said so-called "main" welding device and a second so-called "repair" welding device, carried by the welding unit.

In this case, said second welding device is kept inactive as long as the non-destructive inspection device does not show any defects in the weld bead, and said second welding device is activated when the non-destructive inspection device detects a defect in the weld bead, so as to undertake local re-work of the welding of said parts.

The second welding device thus allows repairs of defective areas of the weld bead to be made without the need for the main welding device which made the weld bead having to return in a reverse direction.

Said welding system advantageously includes an anti-corrosion treatment device carried by the welding unit and/or an anti-corrosion treatment device carried by the counter-bearing unit.

In this case each anti-corrosion treatment device preferable moves in a manner which is synchronised with and delayed in relation to each welding device of the welding unit and, if appropriate, delayed in relation to the non-destructive inspection device which forms part of the same component, whether welding unit or counter-bearing unit, so as to apply anti-corrosion treatment to the weld bead.

If appropriate this anti-corrosion treatment is thus applied after inspection and any repairs to the weld bead.

In general terms it should be noted that the process according to the invention can simultaneously carry out butt welding and transparency welding. In other words, this process can butt weld two adjacent parts whilst simultaneously welding a third part onto respective adjacent end portions of the two adjacent parts.

In one particularly advantageous application of the process according to the invention, said first part is a stiffener for an aircraft and said second part is a panel for an aircraft, or an assembly of two adjacent panels, whereon said stiffener is transparency welded.

Such a panel may be a fuselage panel and said stiffener may be a circumferential frame or an angular segment of such a circumferential frame.

In this case the movement of said support surface is achieved overall along a curved trajectory.

The flange of such a circumferential frame exhibits, for example, a cylindrical revolution form, or a portion of a revolution cylinder.

In this case the movement of said support surface is achieved overall along a trajectory which is circular, or an arc of a circle, centred on a fuselage axis defined by said fuselage panel.

A fuselage panel for an aircraft exhibits an external surface which is defined as being the surface designed to be located on the external side of the aircraft and to be washed by the relative airflow flowing along the fuselage in flight, and an internal surface located on the opposite side. The aforementioned circumferential frame is naturally welded onto the internal surface of the fuselage panel.

In the case where the process involves welding such a circumferential frame onto two adjacent fuselage panels, the joint produced at the end of the process is of the type widely known as an "orbital joint"

Alternatively, said stiffener may be a longitudinal stiffener, also known as a stringer.

In this case the movement of said support surface may be carried out along a substantially rectilinear trajectory, in particular when the fuselage panel is intended for a length of fuselage section located between the nose cone and tail cone of an aircraft.

In yet another alternative the panel may be an aerodynamic panel of a wing-surface element of an aircraft such as an aircraft wing or tail assembly.

In this case the stiffener involved may be a spar or a rib of such an element of an aircraft.

In yet another alternative the panel may be a panel which forms part of the floor of an aircraft, in which case the stiffener may be a cross-member supporting such a floor or a rail for guiding seats to be fitted onto such a floor.

In yet another alternative the panel may form part of an aircraft landing-gear enclosure or form the base of a storage tank in an aircraft.

In all these applications involving a stiffener and a panel for an aircraft, it may be particularly advantageous for said weld bead to extend in cross-section from a first side edge to a second opposite side edge of said stiffener flange.

This enables the welding process to prevent micro-cavities occurring between the flange of the stiffener and the panel, thus reducing the risk of corrosion of these parts whilst ensuring optimum cohesion of the assembly obtained at the end of the process.

In this case the welding process preferably includes the use of a welding system which includes multiple welding heads, each of which includes a rotating pin as well as a shoulder extending to the base of the rotating pin.

Preferentially the footprint formed by all the respective rotary pins of said welding heads substantially extends in cross-section from the first side edge to the second side edge of the flange of the stiffener.

The term "substantially" it is to be understood as meaning that the footprint extends up to a distance of less than 0.2 mm from each lateral edge of the stiffener flange.

The term "footprint" is to be understood as meaning the mark that would be produced in the material by inserting the rotating pins into this material independently of any stirring phenomena caused by the rotation of said pins.

Preferentially each of the rotating pins penetrates the flange of the stiffener to a depth which is 0.2 mm to 0.5 mm from the surface of the flange located on the side away from the welding heads.

This reduces the risk of the rotating pins making contact with said support surface of the counter-bearing unit.

Said multiple welding heads advantageously include three welding heads arranged in a triangular configuration.

Such a configuration of welding heads is particularly well suited to the formation of weld beads which cover the entire width of the aircraft stiffener flanges.

In this case said multiple welding heads preferably include two lateral welding heads centred in relation to a given plane orthogonal to said second direction or direction of welding, as well as a central welding head offset in said direction of welding in relation to each of said lateral welding heads.

Preferentially the projection of the rotating pin of the central welding head in the direction of welding intercepts the respective rotating pins of the lateral welding heads.

This characteristic guarantees a certain degree of overlap between on the one hand the footprint of the rotating pin of the central welding head and on the other hand the respective footprints of the respective rotating pins of the lateral welding heads. This in particular optimises the homogeneity of the weld bead.

Preferentially a first of said welding heads is positioned facing a web of the stiffener whilst the other two welding heads are offset in relation to said stiffener web, and the rotating pin of said first welding head does not penetrate into said stiffener flange so deeply as the respective rotating pins of the other two welding heads.

This configuration reduces the risk of damage to the critical structural parts of the stiffener located close to the web of the latter.

In particular said first welding head may be said central welding head.

This configuration is particularly suitable when the stiffener includes a web which is substantially central in relation to the flange of this stiffener.

Furthermore said welding heads advantageously move in a direction such that said central welding head is arranged to the rear of said lateral welding heads.

BRIEF DESCRIPTION OF THE DRAWINGS

The invention will be more readily understood and other of its details, advantages and characteristics will appear on reading the following description, which is given only as a non-restrictive example, whilst referring to the appended drawings wherein.

In all these figures, identical references can designate identical or analogous elements.

DETAILED DESCRIPTION

Figure 1:
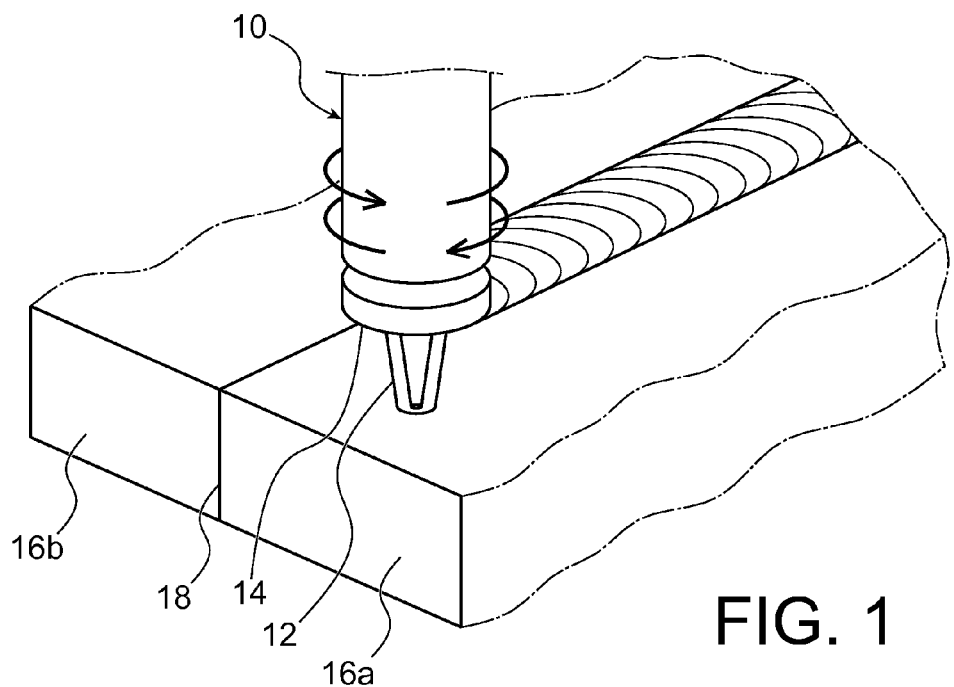
FIG. 1, which has already been described, is a partial perspective diagrammatic view of two parts being butt welded by a friction stir welding technique.
Figure 2:
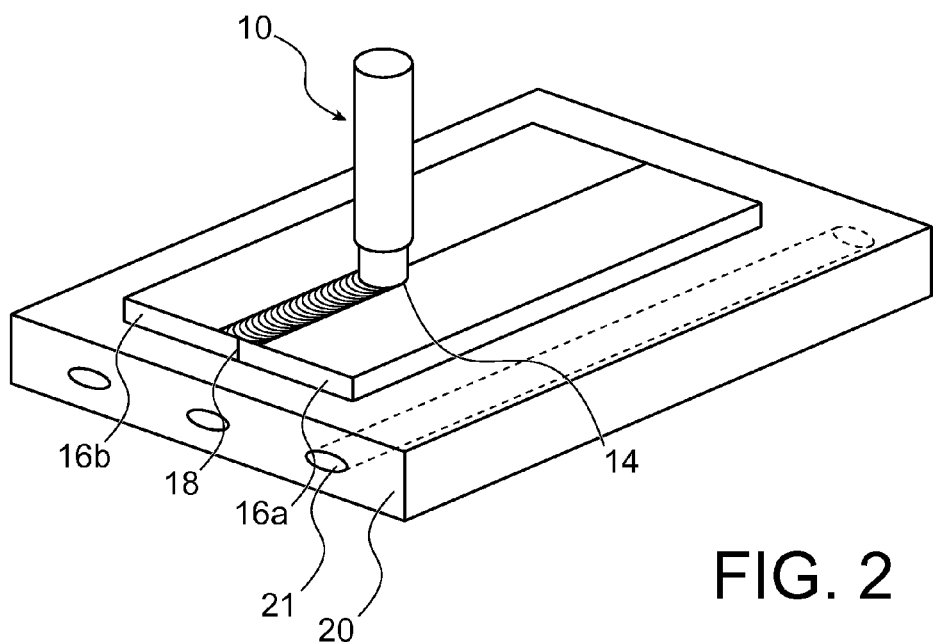
FIG. 2, which has already been described, is a perspective diagrammatic view of two parts being butt welded by a friction stir welding technique, also showing a counter-form for supporting both parts.
Figure 3:
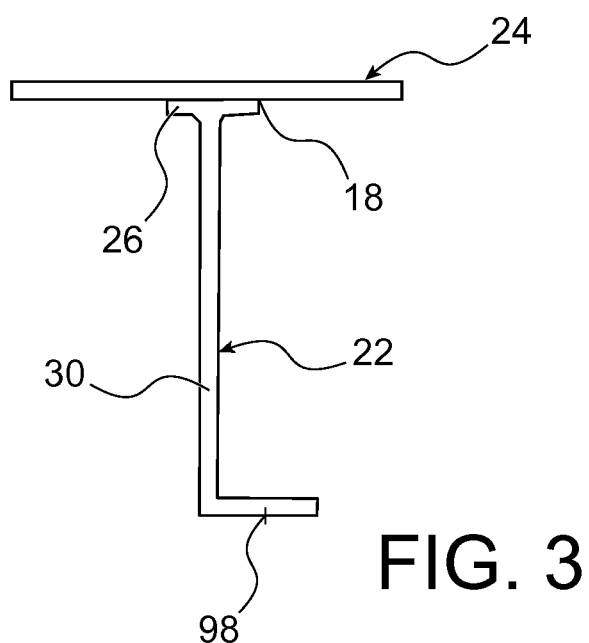
FIG. 3, which has already been described, is a longitudinal section diagrammatic view of a circumferential frame fixed onto an aircraft fuselage panel using a known type of friction stir welding technique.
Figure 4:
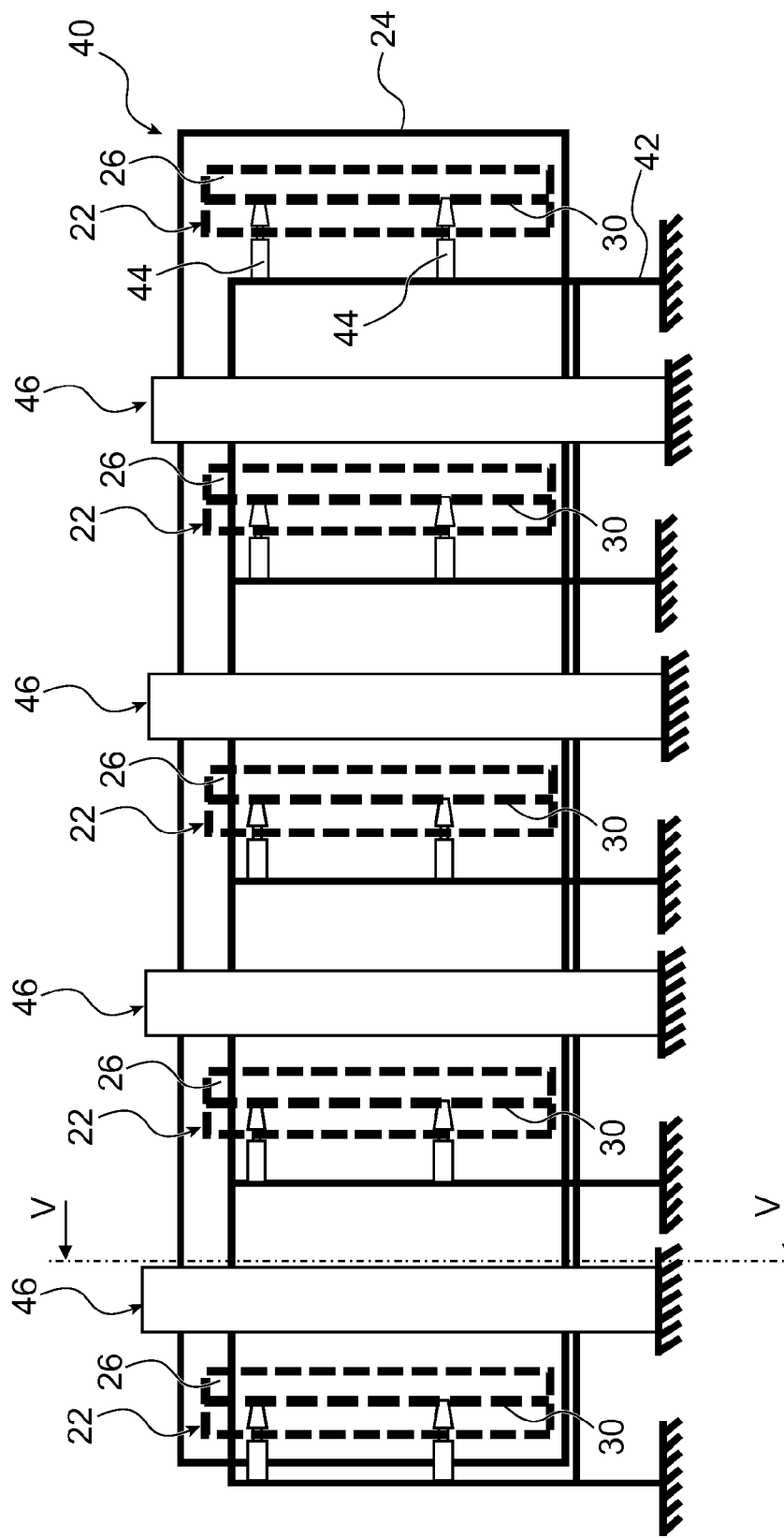
FIG. 4 is a diagrammatic side view of a welding installation including several welding systems according to a preferred embodiment of the invention for the assembly of aircraft circumferential frames and fuselage panels.

FIG. 4 shows a general view of a friction stir welding installation 40 designed to implement a friction stir welding process of the "by transparency" type for assembling circumferential frames onto aircraft fuselage panels, in accordance with a preferred embodiment of the invention.

This FIG. 4 in particular shows five circumferential frames 22 each of which is fixed to a support 42 for example by means of two centring pins 44 respectively passing into two centring holes in the circumferential frame 22, where the latter may be retained, for example, by means of pins which operate in conjunction with the centring pins 44.

A skin formed by an aircraft fuselage panel 24 is applied onto the external surface of the flange 26 of each of the circumferential frames 22.

In addition four welding systems 46 are arranged side-by-side opposite the support 42 which holds the circumferential frames 22 and the fuselage panel 24. For the purposes of clarity, the four welding systems 46 are shown longitudinally offset in relation to the circumferential frames 22, but during the operation of this welding installation 40 each of the welding systems 46 is arranged substantially facing a corresponding circumferential frame 22.

Figure 5:
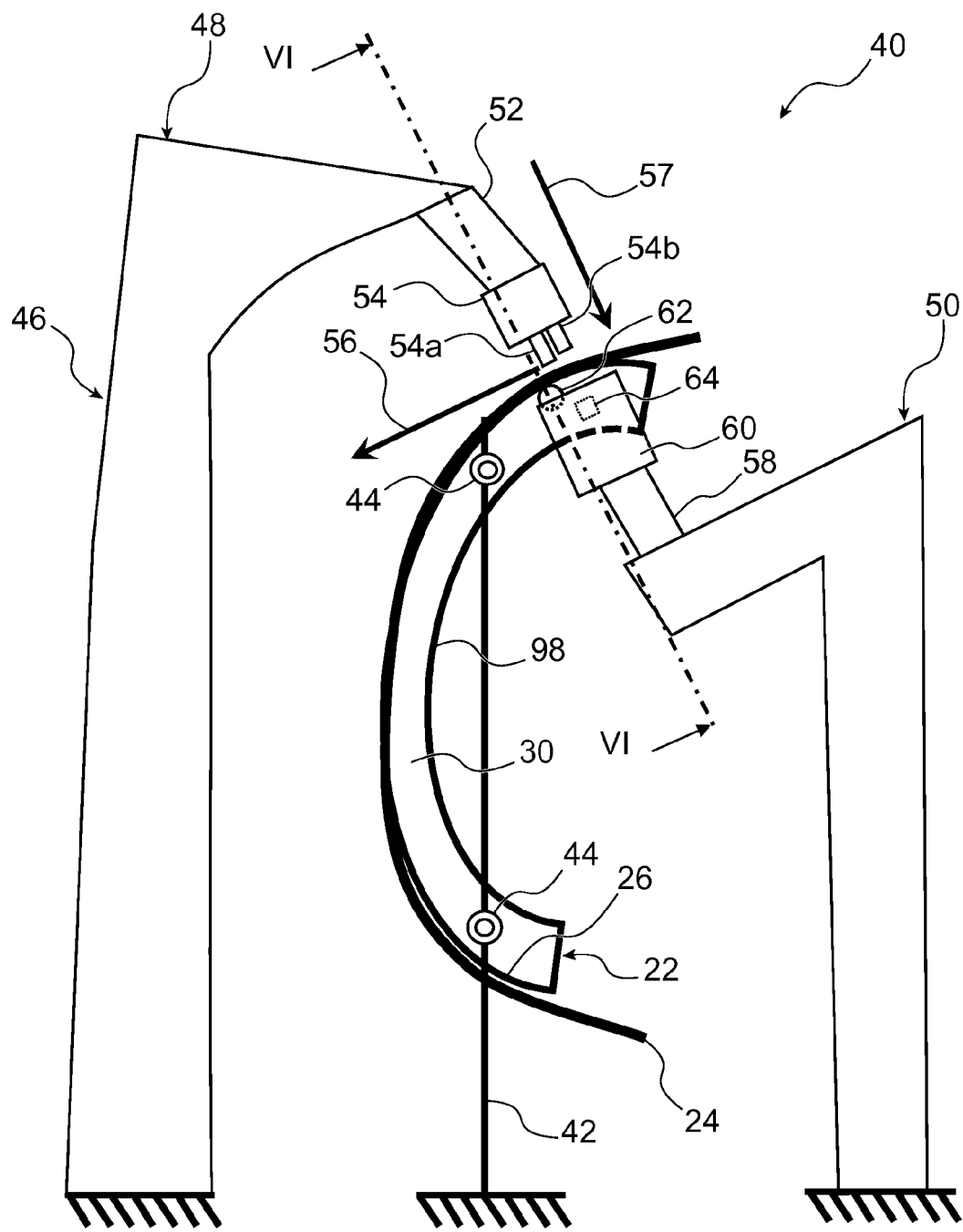
FIG. 5 is a transverse section diagrammatic view, along plane V-V of FIG. 4, of the welding installation in FIG. 4, showing a welding system belonging to this welding installation.

FIG. 5 shows the welding installation 40 in section along plane V-V of FIG. 4 and thus shows one of these welding systems 46 viewed from the side.

This welding system 46 overall includes a welding unit 48 and a counter support unit 50, arranged opposite each other on either side of the support 42 carrying the circumferential frames 22 and the fuselage panel 24.

The welding unit 48 takes the form of a robot which includes at one end of a robotic arm 52 a welding device 54 provided with multiple welding heads, as will become clearer in what is to follow.

The welding unit 48 is designed so as to allow, in particular, movement of the welding device 54 in the plane of FIG. 5 along the circumferential frame 22, along a local direction of welding 56 tangential to the fuselage panel 24.

The welding unit 48 is in addition designed so as to allow the welding device 54 to move in direction in which the respective rotating pins of the welding heads of this welding device penetrate the material forming the fuselage panel 24 and the circumferential frame 22, as will become clearer in what is to follow. This penetration direction is represented by arrow 57 and is parallel to the line forming the intersection of the plane of FIG. 5 and of plane VI-VI that can be seen in FIG. 5. By definition this penetration direction 57 is normal to the external surface of the fuselage panels 24 and is therefore orthogonal to the aforementioned welding direction 56.

The counter-bearing unit 50 also takes the form of a robot equipped with a robotic arm 58. This latter has an extremity equipped with two support arms 60 arranged on either side of the web 30 of the circumferential frame 22, with only one of these support arms 60 being visible in FIG. 5. These support arms 60 each hold a clamp roller 62 as well as a guide roller 64, as will become clearer in what is to follow.

Figure 6:
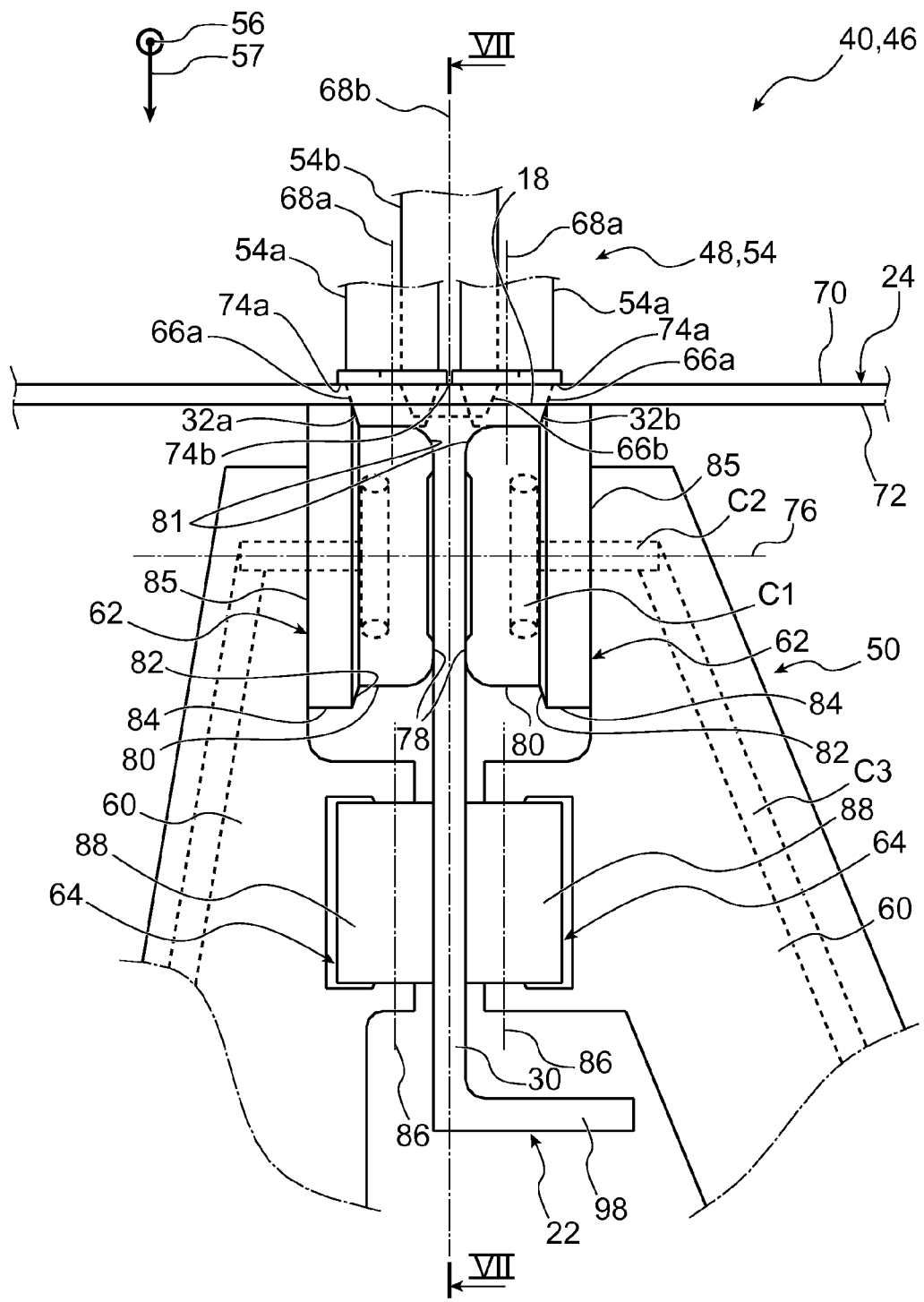
FIG. 6 is a partial diagrammatic view, on a larger scale and in longitudinal section along plane VI-VI of FIG. 5, of the welding system in FIG. 5.

FIG. 6 shows in greater detail the main elements used to implement the friction stir welding process using the welding installation 40.

As shown in FIG. 6, the welding device 54 includes three welding heads arranged as a triangle (FIG. 6). These welding heads are distributed as two lateral welding heads 54a and a central welding head 54b, where the latter is offset towards the rear relative to the lateral welding heads 54a (the rear being defined along the direction of welding 56), as is more clearly shown in FIG. 7.

Each of the three aforementioned welding heads 54a, 54b includes a rotating pin 66a, 66b (FIGS. 6 and 7), which rotates about a rotation axis 68a, 68b, which is substantially orthogonal to the direction of welding 56 and therefore also substantially normal to the external 70 and internal surfaces 72 of the fuselage panel 24. Each of the three welding heads 54a, 54b includes in addition a shoulder 74a, 74b formed at the base of the corresponding rotating pin 66a, 66b. This shoulder 74a, 74b can rotate in the same or opposite direction to the direction of rotation of the corresponding rotating pin 66a, 66b, or even be static, in a manner which is known per se. Each rotating pin 66a, 66b has an overall tapering form, so that the cross-section of each rotating pin decreases in the direction of the free end of the rotating pin, that is, of the side opposite the corresponding shoulder 74a, 74b. The maximum diameter Dmax (FIG. 7) is defined for each rotating pin as being the diameter of the cross-section of the pin where the latter is widest, which is at the base of the rotating pin next to the corresponding shoulder 74a, 74b.

Naturally the welding unit 48 includes drive motor means allowing the rotating pins 66a, 66b to rotate, and if appropriate allowing the shoulders 74a, 74b to rotate.

Figure 7:
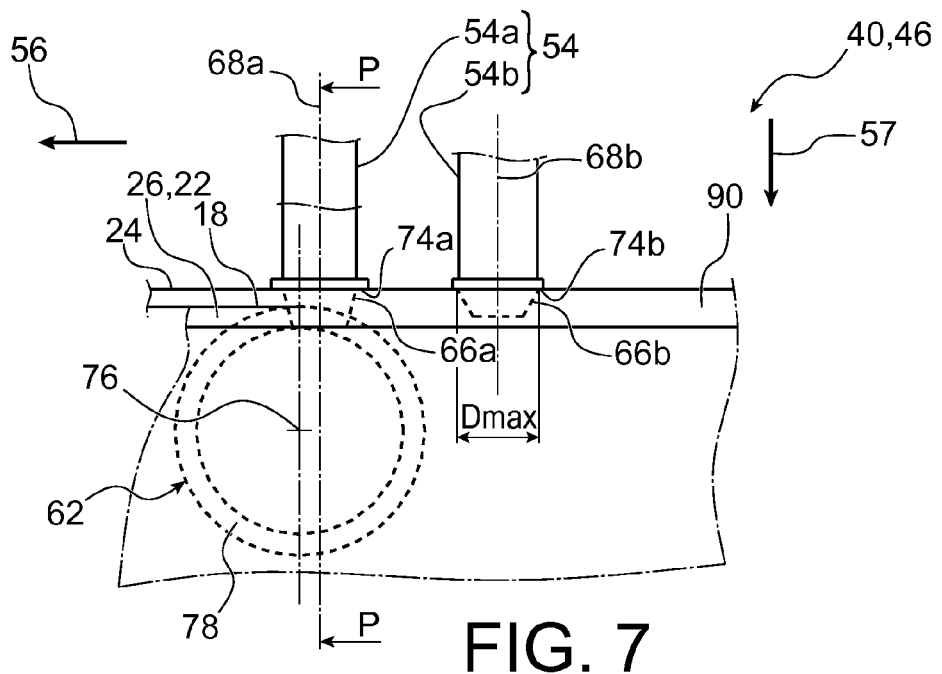
FIG. 7 is a diagrammatic view on a larger scale of a portion of FIG. 5 in section along plane VII-VII of FIG. 5.
Figure 8:
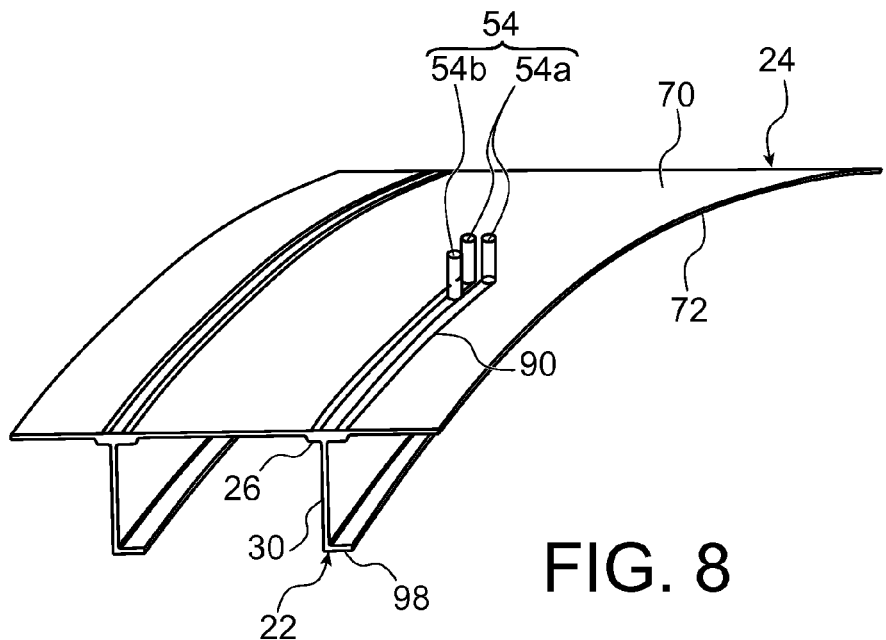
FIG. 8 is a partial perspective diagrammatic view of an aircraft fuselage panel and of two circumferential frames fixed to the former, showing the passage of welding heads on this panel.

The respective shoulders 74a, 74b of the aforementioned welding heads extend in the same plane. These shoulders 74a, 74b may thus be pressed simultaneously onto the external surface 70 of the fuselage panel 24, as FIGS. 6 and 7 show.

The respective rotating pins 66a of the lateral welding heads 54a have a height which is slightly less than the cumulative thickness of the fuselage panel 24 and of the flange 26 of the circumferential frame 22. The difference between the height of these rotating pins 66a and the cumulative thickness of the fuselage panel 24 and of the flange 26 is typically of the order of a few tenths of a millimeter, preferably between 0.2 and 0.5 mm. The term "height" of the rotating pins naturally refers to their length along their axis of rotation.

Furthermore the rotating pin 66b of the central welding head 54b has a height less than that of the respective rotating pins 66a of lateral welding heads 54a, but greater than the thickness of the fuselage panel 24. The difference in height between on the one hand the rotating pin 66b and on the other hand the rotating pins 66a is typically of the order of a few tenths of a millimeter, preferably between 0.2 mm and 0.5 mm.

In general terms the three rotating pins 66a, 66b are arranged so that the projection of the rotating pin 66b of the central welding head 54b, perpendicular to a plane P (FIG. 7) passing through the respective axes of rotations 68a of said respective rotating pins 66a of lateral welding heads 54a in the direction of the latter, intercepts these latter rotating pins 66a (FIG. 6). Furthermore, the width of the assembly formed by the three rotating pins 66a, 66b is substantially equal to the width of the flange 26 of the circumferential frame 22. This guarantees that the weld bead obtained using the welding unit manages to cover the entire width of the aforementioned flange 26, as will become clearer in what is to follow.

The FIG. 6 shows in addition an end part of each of the support arms 60, which includes the clamp roller 62 and the guide roller 64 carried by the support arm 60.

Each clamp roller 62 is fitted so that it rotates on the corresponding support arm 60 around an axis of rotation 76 which also forms an axis for a geometric revolution of the roller.

The clamp rollers 62 have respective side-walls 78 designed to be applied respectively against the two sides of the web 30 of the circumferential frame 22. In this way the web 30 of the circumferential frame 22 may be sandwiched between the respective side-walls 78 of clamp rollers 62 as shown in FIG. 6. To this end the robotic arm 58 of the counter-bearing unit 50 includes means for operating the support arms 60 which can cause each support arm 60 to move towards the other support arm 60 and thus move said clamp rollers 62 towards each other.

Each clamp roller 62 has in addition a main circumferential track 80 which is cylindrical in form and which revolves around the axis of rotation 76, extending from the side-wall 78 of the clamp roller 62 and designed to be pressed against the inner surface of the flange 26 of the circumferential frame 22, as shown in FIG. 6.

The side-wall 78 of each clamp roller 62 is connected to the corresponding main circumferential track 80 by a curved circumferential part 81 designed to fit against the curved surface which connects the corresponding side of the web 30 of the circumferential frame 22 to the flange 26 of the latter.

The respective main circumferential tracks 80 of the two clamp rollers 62 in combination form a support surface on the flange 26 of the circumferential frame 22, in the terminology belonging to the invention.

Furthermore each clamp roller 62 has a circumferential shoulder 82 which defines one end of the main circumferential track 80 of the clamp roller on the side facing the side-wall 78 of the latter. This circumferential shoulder 82 is connected to a secondary circumferential track 84 of the clamp roller which extends to an end face 85 of this clamp roller 62 defined on the side facing the side-wall 78 of the latter. The secondary circumferential track 84 is intended to be substantially in contact with the internal surface 72 of the fuselage panel 24 as shown in FIG. 6. To this end the circumferential shoulder 82 of each clamp roller 62 has a width that is substantially equal to the thickness of the flange 26 of the circumferential frame 22.

It should be noted that the main 80 and secondary 84 circumferential tracks of each clamp roller may be of a cylindrical or tapered form.

The clamp rollers 62 in addition include a cooling device. Each of these clamp rollers thus includes a substantially annular channel C1 centred on the axis of rotation 76 of the clamp roller 76, and has an end which is connected to an inlet channel C2 and an opposite end which is connected to an outlet channel (not shown in the figure). Said inlet and outlet channels open onto the end face 85 of the clamp roller and are respectively connected to a supply pipe C3 and to an outlet pipe (not shown in the figure) which are arranged in the corresponding support arm 60 and which are connected to a heat exchanger (not shown) used to cool the heat-transfer fluid.

Furthermore each guide roller 64 is fitted so that it can rotate around a respective axis of rotation 86 which is orthogonal to the axis of rotation 76 of the corresponding clamp roller 62.

Each guide roller 64 has a circumferential guide track 88 which is cylindrical in form and which revolves around the axis of rotation 86 of the guide roller 64, and which is designed to be pressed against a corresponding surface of the flange 30 of the circumferential frame 22.

The friction stir welding process used to weld a circumferential frame 22 onto a fuselage panel 24 using one of the welding systems 46 of the welding installation 40 will now be described in further detail, with reference to FIGS. 5 to 8.

This process firstly involves pre-positioning of the welding unit 48 and of the counter-bearing unit 50 of the welding system 46 in such a way that these elements be facing a circumferential frame 22. If necessary this pre-positioning may be achieved by moving the welding system 46 of the welding installation 40 and/or by moving the support 42 carrying the circumferential frames 22 and the fuselage panel 24.

The process then involves positioning of the respective rotating pins 66a, 66b of the three welding heads 54a, 54b perpendicular to the flange 26 of the circumferential frame 22. Because of the layout of the three rotating pins 66a, 66b, the projection of the assembly formed by these three rotating pins in the penetration direction 57 then substantially intercepts the entire width of said flange 26. This positioning may be achieved by an operation of the robotic arm 52 of the welding unit 48.

The process then involves an operation of the welding unit 48, in particular of the robotic arm 52, so as to bring the free ends of the rotating pins 66a, 66b into contact with the external surface of the fuselage panel 24.

The process also includes positioning of each clamp roller 62 of the counter-bearing unit 50 so that the side-wall 78 of each clamp roller 62 is pressed against the web 30 of the circumferential frame 22 and so that the main circumferential track 80 of each clamp roller 62 is pressed against the flange 26 of the circumferential frame 22. In particular each clamp roller 62 is positioned such that its axis of rotation 76 is locally parallel to the fuselage panels 24 and orthogonal to the directions of welding 56 and of penetration 57. The positioning of the clamp rollers 62 may be achieved by operating the counter-bearing unit 50, in particular the robotic arm 58.

In this position of the clamp rollers 62, illustrated in FIG. 6, the axis of rotation 76 of each clamp roller 62 is orthogonal to the web 30 of the circumferential frame 22 whilst the axis of rotation 86 of each guide roller 64 is parallel to the aforementioned web 30. Furthermore the circumferential shoulder 82 of each clamp roller 62 is pressed against the lateral edge of the flange 26 of the circumferential frame 22 (FIG. 6) and the circumferential track 88 of each guide roller 64 is pressed against the web 30 of the circumferential frame 22.

In general terms the clamp rollers 62 are in addition placed facing the welding device 54. In the example shown the positioning of the clamp rollers 62 is such that each of the clamp rollers 62 is intercepted by the axis of rotation 68a of the rotating pin 66a of one of the lateral welding heads 54a (FIGS. 6 and 7). More specifically, the axis of revolution 76 of each of the clamp rollers 62 is offset slightly forwards in relation to the axis of rotation 68a of the corresponding rotating pin 66a, so that the projection of this axis of revolution 76 of each of the clamp rollers 62 in parallel to the axis of rotation 68a of said clamp roller nevertheless intercepts the latter.

The process involves making the rotating pins 66a, 66b rotate, and if appropriate making the associated shoulders 74a, 74b rotate, then inserting the rotating pins into the material which forms the fuselage panel 24 then also into the material forming the flange 26 of the circumferential frame 22. This insertion is made possible by local softening of the material, caused by the friction of the rotating pins, according to the well-known principle of friction stir welding.

The process then involves operating the welding unit 48, in particular the robotic arm 52, so that the welding heads 54a, 54b move along the circumferential frame 22, preferably in such a manner that the rotating pins 66a, 66b cover the entire flange 26 of this circumferential frame 22.

During the movement of the welding heads 54a, 54b, the rapid rotation of the rotating pins 66a, 66b produces, around each of these rotating pins, stirring of the locally softened material which forms the fuselage panel 24 as well as the flange 26. Because of the layout of the three rotating pins 66a, 66b, the region of stirred material extends from one lateral edge 32a to the other 32b of said flange 26. In the example shown the footprint of all three rotating pins 68a, 68b covers, in cross-section, the entire aforementioned flange 26 during movement of the welding heads 54a, 54b. This means that the footprint extends from one lateral edge 32a to the other 32b of the flange 26. The term "footprint" is to be understood to mean the mark that would be produced in the material by inserting the rotating pins 66a, 66b into this material independently of any stirring phenomena caused by the rotation of said pins.

In addition and still during the movement of the welding heads 54a, 54b, due to the limited height of the rotating pin 66b of the central welding head 54b as explained above, this latter rotating pin 66b does not reach the curved surfaces of the circumferential frame 22 which are respectively in contact with the respective curved circumferential parts 81 of the clamp rollers 62, and which respectively connect the faces of the web 30 of the circumferential frame 22 to the flange 26 of the latter. The integrity of these curved surfaces of the circumferential frame 22 can therefore be preserved.

Furthermore, the respective rotating pins 66a of the lateral welding heads 54a do not reach the respective main circumferential tracks 80 of the clamp rollers 62, due to the limited height of these rotating pins 66a, as explained above.

At the same time, the counter-bearing unit 50 is operated so as to achieve a rolling motion of the clamp rollers 62 over the internal surface of the flange 26 of the circumferential frame 22 and over the internal surface 72 of the fuselage panel 24, in a manner which is synchronised with the movement of the welding device 54, so that the clamp rollers 62 continuously exert a support substantially opposing the pressure exerted by the assembly of respective rotating pins 66a, 66b of the welding heads 54a, 54b as shown in FIG. 7.

The clamp rollers 62 in addition play a part in the confinement and conformation of the softened material by fitting against the section of the flange 26 of the circumferential frame 22. The circumferential shoulder 82 of each of the clamp rollers 62 is in particular used to retain the material on each side of said flange 26.

In combination with the movement of clamp rollers 62 the guide rollers 64 respectively roll over both faces of the web 30 of the circumferential frame 22 and thus contribute to centring this circumferential frame 22 in relation to the fuselage panel 24.

At the end of the welding process, after cooling, the material that was previously stirred regains its rigidity and forms a weld bead 90 (FIG. 8) which provides full cohesion between the flange 26 of the circumferential frame 22 and the fuselage panel 24. This weld bead 90 corresponds to the region of material that was previously stirred and therefore covers the entire width of the flange 26 of the circumferential frame 22.

The process described above corresponds to the work of one of the welding systems 46 in the installation 40. Naturally the other welding systems 46 can carry out the same process in parallel.

It should be noted that the process described above can also be applied to the welding of a circumferential frame simultaneously onto two adjacent fuselage panels. In this case the process jointly carries out butt welding of the two adjacent panels and transparency welding of the circumferential frame onto the adjacent ends of said panels.

Figure 9:
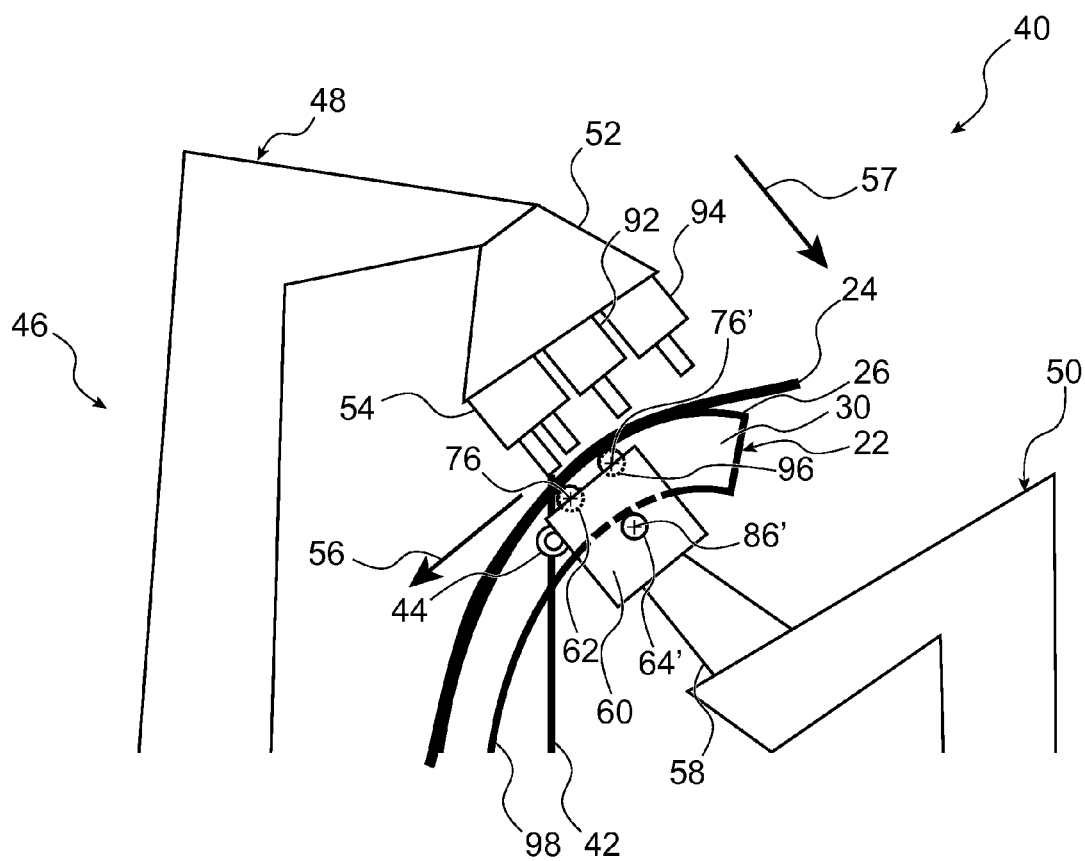
FIG. 9 is a partial diagrammatic side view of a welding installation which includes a welding system according to another embodiment of the invention.

FIG. 9 shows a welding system 46 according to another embodiment of the invention, wherein the welding unit 48 includes in addition a non-destructive inspection device 92 as well as an anti-corrosion treatment device 94 which are carried by the robotic arm 52 and which may each be of a conventional type. The non-destructive inspection device 92 is, for example, an ultrasound inspection device.

During the implementation of the welding process, the welding unit is positioned so that the non-destructive inspection device 92 is arranged so that there is a delay, that is to say, it is to the rear in relation to the welding device 54 and in such a way that the anti-corrosion treatment device 94 is arranged so that there is a delay, that is to say it is to the rear in relation to the non-destructive inspection device 92, allowing for the direction of welding 56.

In this way the non-destructive inspection device 92 is used to inspect the quality of the weld bead 90 automatically and immediately after it is formed.

In the event of a defect being detected, the welding process then includes a reverse motion of the welding device 54, then a re-work of the weld starting from the defect zone of the weld bead 90.

Furthermore the anti-corrosion treatment device 94 can be used to apply an anti-corrosion treatment onto the external surface of the fuselage panel 24 at the weld bead 90, immediately after the quality inspection by the latter when the inspection reveals no defects.

Alternatively or in a complementary manner a non-destructive inspection device and/or an anti-corrosion device may be fitted to the robotic arm 58 of the counter-bearing unit 50 in order to act on the flange 26 of the circumferential frame 22.

In addition, the example in FIG. 9 shows another configuration of clamp rollers and of guide rollers.

In effect the counter-bearing unit 50 in FIG. 9 includes not only the two clamp rollers 62 described above but also two additional clamp rollers 96 arranged to the rear of the clamp rollers 62, allowing for the direction of welding 56, and which are similar to the latter. These additional clamp rollers 96 are also pressed against the internal surface of the flange 26 of the circumferential frame 22.

The counter-bearing unit 50 includes two guide rollers 64' whose axes of rotation 86' are parallel to the respective axes of rotation 76 and 76' of the clamp rollers 62 and 96. These guide rollers 64' are pressed onto the internal surface of the runner 98 of the circumferential frame 22. It should be noted that this runner 98 can be seen more clearly in FIGS. 6 and 8.

Figure 10:
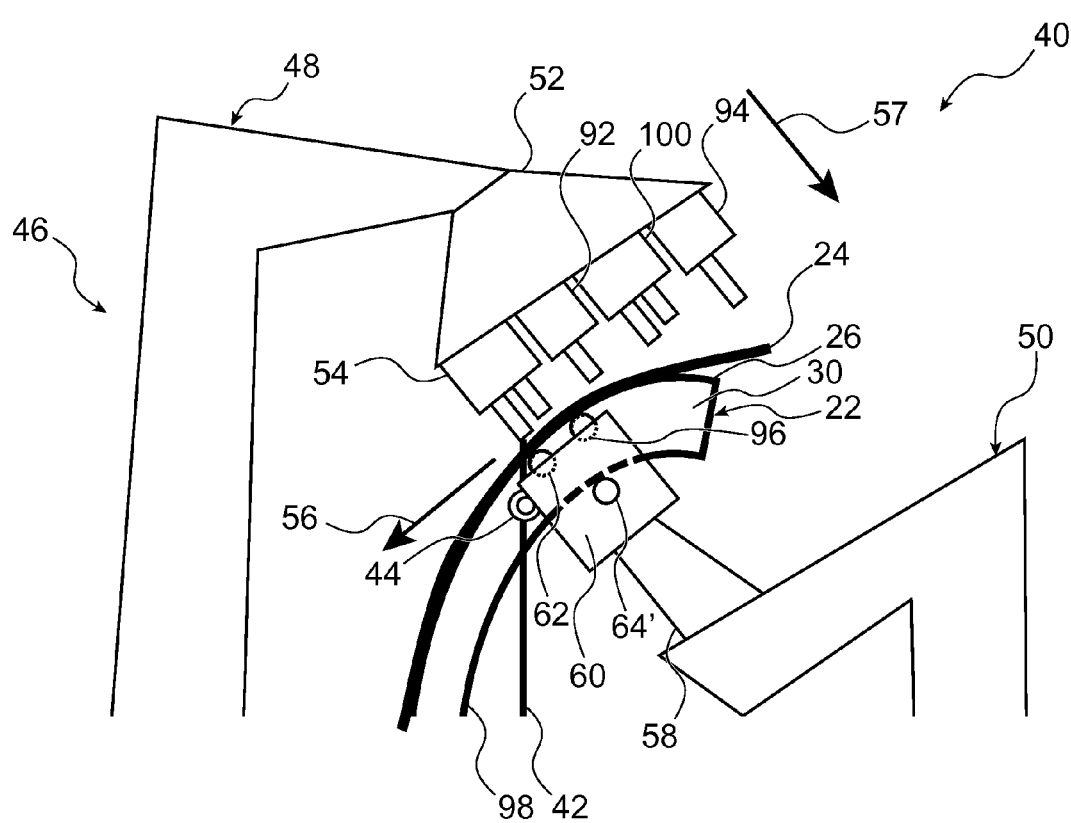
FIG. 10 is a partial diagrammatic side view of a welding installation which includes a welding system according to yet another embodiment of the invention.

Furthermore, in another embodiment of the invention shown in FIG. 10, the welding unit 48 in addition includes a repair device formed by a second welding device 100, preferably similar to the welding device 54 described above, but arranged between the non-destructive inspection device 92 and the anti-corrosion treatment device 94.

This second welding device 100 is kept inactive as long as the non-destructive inspection device 92 does not detect any defect, and is activated following the detection of any defect. In this case the process then includes re-work of the weld in the defect zone of the weld-bead 90 by means of the second welding device 100. At the end of this re-work of the defect zone, the process continues normally using the welding device 54.

The second welding device 100 thus avoids any reverse motion of the welding device 54 in the event of a defect being detected in the weld bead 90 by means of the non-destructive inspection device 92. This makes the welding process even more rapid.

In the preceding description, an example of the welding process according to the invention and of an installation allowing this process to be implemented have been described as far as the welding of a circumferential frame onto an aircraft fuselage panel is concerned.

It should be noted that the invention can be applied to the welding of other parts, in particular to the welding of longitudinal stiffeners, spars or cross-members.

The invention claimed is:

1. A friction stir welding system for welding at least two parts to be assembled, the friction stir welding system comprising:

a welding unit which includes a welding device which includes at least one welding head provided with a rotating pin;

a counter-bearing unit which offers a support surface designed to support the parts to be assembled against a pressure exerted by each of the at least one welding head;

wherein:

the at least one welding head is moved relative to the support surface of the counter-bearing unit, in a first direction parallel to an axis of rotation of the rotating pin of each of the at least one welding head;

each of the at least one welding head is moved in a second direction which is orthogonal to the axis of rotation of the rotating pin of the at least one welding head;

the counter-bearing unit is configured for moving the support surface along the second direction;

wherein the counter-bearing unit includes two clamp rollers set apart from each other and which have a common axis of revolution which is substantially orthogonal to the first direction and orthogonal to the second direction, where each of the clamp rollers has a main circumferential track which forms at least one part of the support surface; and wherein the counter-bearing unit is configured for moving the clamp rollers towards each other so that two respective side-walls of each of the clamp rollers are configured to contact and sandwich a portion of a first part of the at least two parts between the two respective side-walls, and the side-wall of each clamp roller is connected to the corresponding main circumferential track by a curved circumferential part.

2. The welding system according to claim 1, wherein each of the clamp rollers includes a circumferential shoulder protruding radially outwards.

3. The welding system according to claim 2, wherein each of the clamp rollers has a secondary circumferential track connected to the main circumferential track of the clamp roller through the circumferential shoulder of the clamp roller.

\* \* \* \* \*